US008007115B2

(12) United States Patent
Furuse

(10) Patent No.: US 8,007,115 B2
(45) Date of Patent: Aug. 30, 2011

(54) LAMP DRIVING APPARATUS AND CONTROL METHOD THEREOF

(75) Inventor: Hiroyasu Furuse, Kanagawa (JP)

(73) Assignee: Sony Corporation, Tokyo (JP)

( * ) Notice: Subject to any disclaimer, the term of this patent is extended or adjusted under 35 U.S.C. 154(b) by 562 days.

(21) Appl. No.: 12/170,855

(22) Filed: Jul. 10, 2008

(65) Prior Publication Data

US 2009/0058321 A1 Mar. 5, 2009

(30) Foreign Application Priority Data

Aug. 28, 2007 (JP) ................................ 2007-221273

(51) Int. Cl.
*G03B 21/20* (2006.01)

(52) U.S. Cl. ........................................ 353/85; 353/121

(58) Field of Classification Search .................... 353/75, 353/85, 121, 122

See application file for complete search history.

(56) References Cited

U.S. PATENT DOCUMENTS 7,377,658 B2 * 5/2008 Jayaram et al. ............... 353/121
7,532,827 B2 * 5/2009 Nakazawa ....................... 399/12
2006/0087622 A1 * 4/2006 Brown ............................ 353/57

FOREIGN PATENT DOCUMENTS

JP 5-260423 10/1993

* cited by examiner

*Primary Examiner* — Thuy Vinh Tran
(74) *Attorney, Agent, or Firm* — Oblon, Spivak, McClelland, Maier & Neustadt, L.L.P.

(57) ABSTRACT

A lamp driving apparatus configured to drive a plurality of types of lamps, each of the plurality of lamps is attached with lamp identification information for uniquely identifying the lamp. The lamp driving apparatus includes: a lamp power supply configured to drive the lamp; a read circuit configured to read the lamp identification information from the lamp; and a control circuit configured to control the lamp power supply on the basis of a result of identification obtained by use of the read lamp identification information. The control circuit, if the lamp is found to be authorized, makes the lamp power supply drive the lamp.

6 Claims, 4 Drawing Sheets

LAMP DRIVING APPARATUS AND CONTROL METHOD THEREOF

CROSS REFERENCES TO RELATED APPLICATIONS

The present invention contains subject matter related to Japanese Patent Application JP 2007-221273 filed in the Japan Patent Office on Aug. 28, 2007, the entire contents of which being incorporated herein by reference.

BACKGROUND OF THE INVENTION

1. Field of the Invention

The present invention relates to a lamp driving apparatus and a control method thereof and, more particularly, to a lamp driving apparatus and a control method thereof that are configured to enhance the quality of lamps.

2. Description of the Related Art

Along with the recent progression of image display technologies, projectors applicable to the so-called digital cinema, namely, projectors available to the use of movie screening in motion-picture theaters have been coming on the market (for example, refer to Japanese Patent Laid-open No. Hei 5-260423).

SUMMARY OF THE INVENTION

Because no authentication is made on the lamp used in projectors, third-party lamps may be used. However, many third-party lamps are generally inferior in quality. Projection lamps are key parts for keeping the quality of digital cinema, so that use of these lamps may cause problems of the degraded quality of images on the screen.

In addition, in the case of xenon lamps for use in digital cinema, an attempt to use noncompliant lamps poses a danger of the bursting thereof. If the burst happens, not only the viewing of movies being on the screen is interrupted, but also cinematographists around the bursting lamp may be hurt.

Therefore, the present invention addresses the above-identified and other problems associated with related-art methods and apparatuses and solves the addressed problems by providing a lamp driving apparatus and a control method thereof that are configured to enhance the quality of lamps by authenticating each lamp to be mounted.

In carrying out the present invention and according to an embodiment thereof, there is provided a lamp driving apparatus configured to drive a plurality of types of lamps. Each of the plurality of lamps is attached with lamp identification information for uniquely identifying the lamp. This lamp driving apparatus includes a lamp power supply configured to drive the lamp; a read circuit configured to read the lamp identification information from the lamp; and a control circuit configured to control the lamp power supply on the basis of a result of identification obtained by use of the read lamp identification information. The control circuit, if the lamp is found to be authorized, makes the lamp power supply drive the lamp.

The above-mentioned lamp driving apparatus further includes a communications circuit configured to transmit the read lamp identification information to an authentication apparatus configured to authenticate the lamp. The communications circuit receives an authentication result of the lamp transmitted from the authentication apparatus and the control circuit controls the lamp power supply on the basis of the received authentication result.

In the above-mentioned lamp driving apparatus, the lamp identification information is recorded to a non-contact type IC (Integrated Circuit) chip mounted on the lamp and the read circuit, when in a state of proximity communication with the non-contact type IC chip, reads the lamp identification information from the non-contact type IC chip.

In the above-mentioned lamp drive apparatus, the lamp identification information is stored in a storage apparatus arranged on the lamp and the read circuit reads the lamp identification information from the storage apparatus when the lamp is mounted.

In the above-mentioned lamp driving apparatus, the lamp driving apparatus is a projector. This projector is configured to project an image onto a screen by a light radiated from the lamp.

In the above-mentioned lamp driving apparatus, the lamp driving apparatus is a stepper. This stepper is configured to manufacture semiconductor devices by projecting a predetermined pattern onto a surface of a wafer for exposure by a light radiated from the lamp.

In carrying out the present invention and according to an embodiment thereof, there is provided a control method of controlling the above-mentioned lamp driving apparatus.

In the lamp driving apparatus and the control method of this lamp driving apparatus, if, on the basis of the lamp identification information attached to a lamp, this lamp is found to be authorized, then the authorized lamp is driven by the lamp power supply.

As described and according to an embodiment of the present invention, the quality of each lamp can be enhanced.

DETAILED DESCRIPTION OF THE PREFERRED EMBODIMENTS

Figure 1:
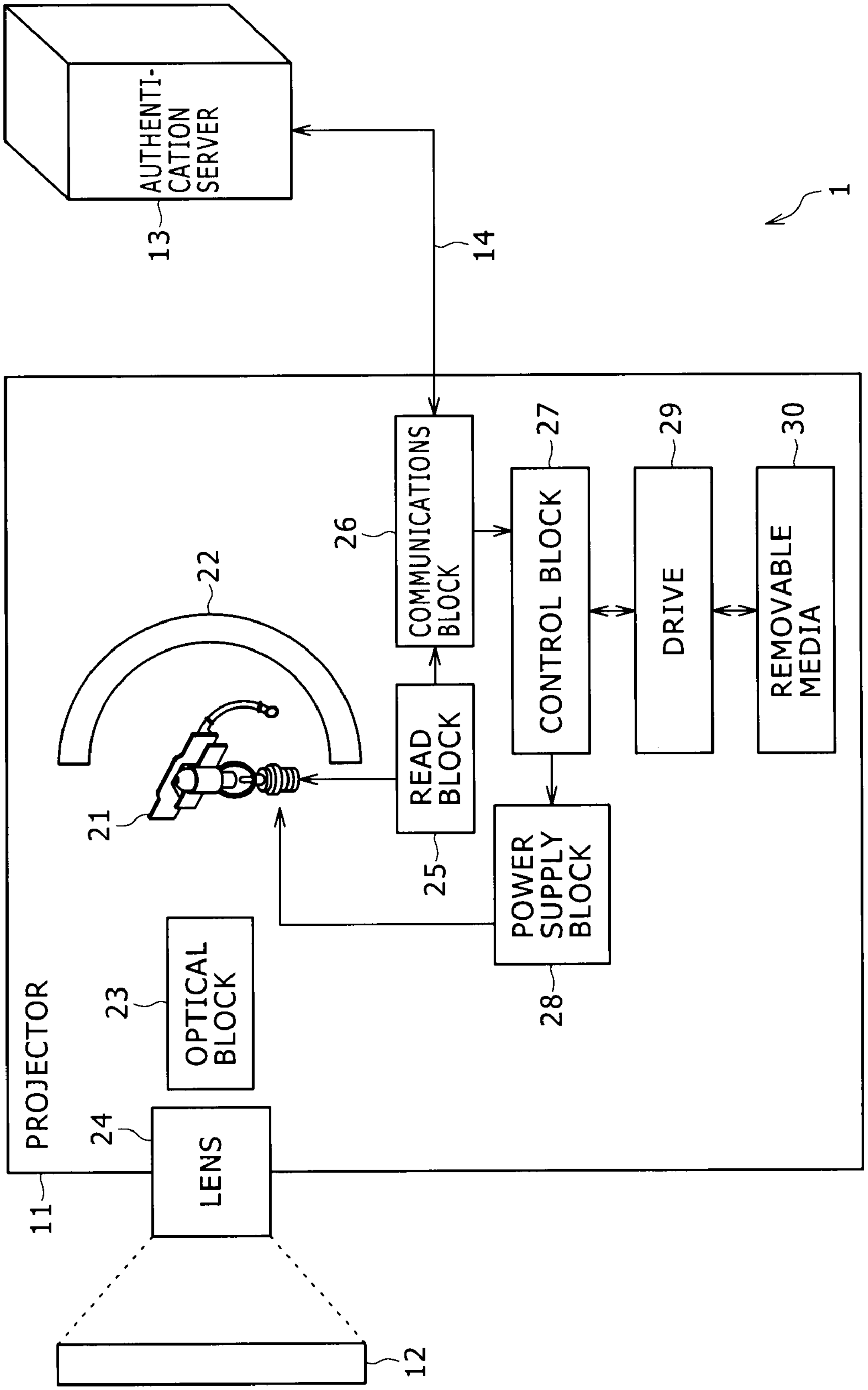
FIG. 1 is a block diagram illustrating an exemplary configuration of an authentication system practiced as an embodiment of the present invention.

The present invention will be described in further detail by way of example with reference to the accompanying drawings. The present invention described herein and the embodiments thereof have the following correlation. The description hereof is intended to make sure of the fact that the embodiments supporting the present invention described herein are described herein. Therefore, if there is any embodiment that, although described in the description of the preferred embodiment, is not described herein as corresponding to the present invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

In a lamp driving apparatus (for example, a projector 11 shown in FIG. 1) according to an embodiment of the present invention configured to drive a plurality of types of lamps (for example, lamps 21 shown in FIG. 1), each of the plurality of lamps is attached with lamp identification information (for example, a serial number) for uniquely identifying the lamp. The lamp driving apparatus includes a lamp power supply (for example, a power supply block 28 shown in FIG. 1) configured to drive the lamp; a read circuit (for example, a read block 25 shown in FIG. 1) configured to read the lamp identification information from the lamp; and a control circuit (for example, a control block 27 shown in FIG. 1) configured to control the lamp power supply on the basis of a result of identification obtained by use of the read lamp identification information. The control circuit, if the lamp is found to be authorized, makes the lamp power supply drive the lamp (for example, processing of step S15 shown in FIG. 4 that is executed by the control block 27 shown in FIG. 1).

Figure 4:
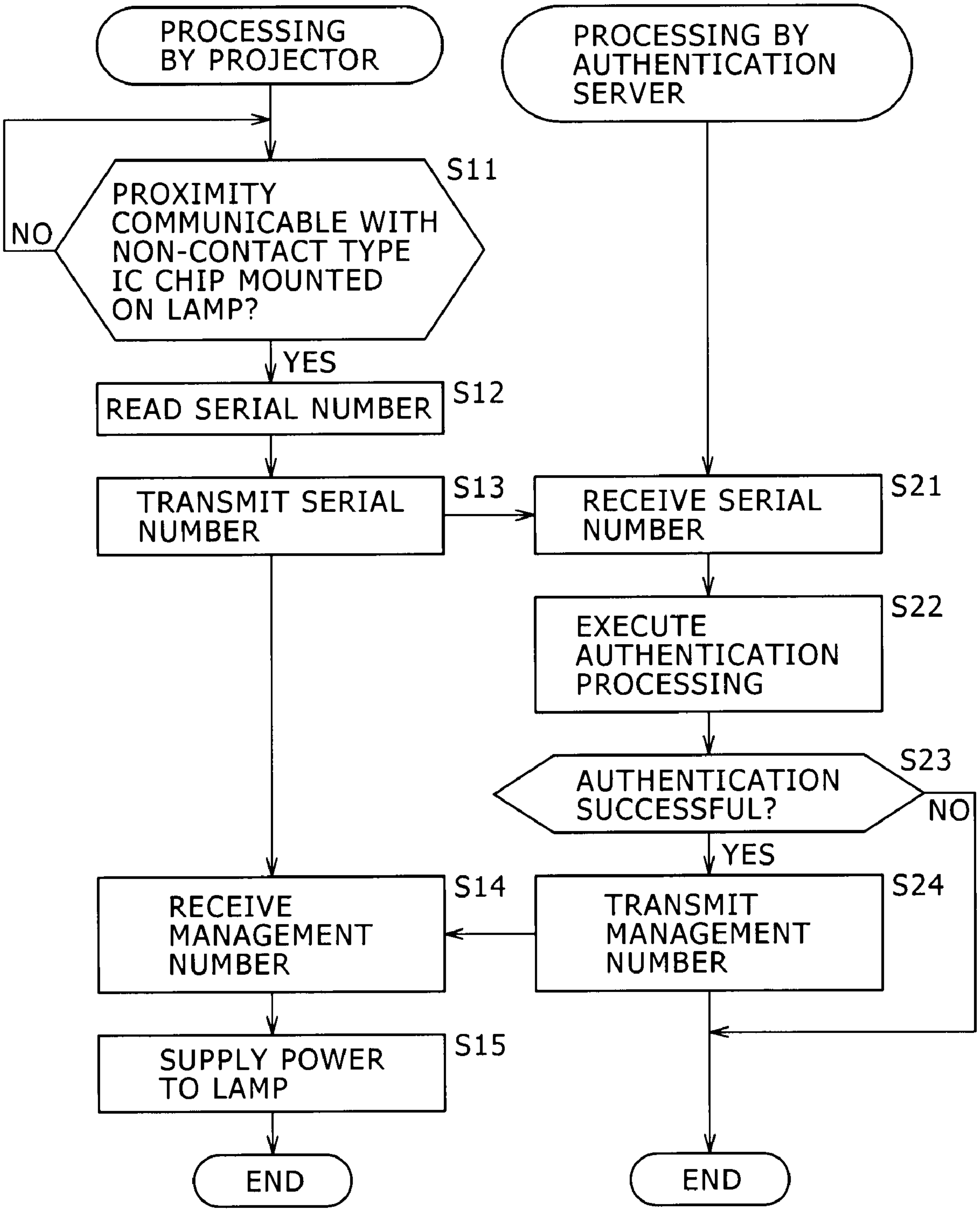
FIG. 4 is a flowchart indicative of authentication processing.

The above-mentioned lamp driving apparatus further includes a communications circuit configured to transmit the read lamp identification information to an authentication apparatus (for example, an authentication server 13 shown in FIG. 1) configured to authenticate the lamp (processing of step S13 shown in FIG. 4 that is executed by a communications block 26 shown in FIG. 1). The communications circuit receives an authentication result of the lamp transmitted from the authentication apparatus (for example, processing of step S14 shown in FIG. 4 that is executed by the communications block 26 shown in FIG. 1). The control circuit controls the lamp power supply on the basis of the received authentication result (for example, processing of step S15 shown in FIG. 4 that is executed by the control block 27 shown in FIG. 1).

In the above-mentioned lamp driving apparatus, the lamp identification information is recorded to a non-contact type IC chip (for example, a non-contact type IC chip 41 shown in FIG. 2) mounted on the lamp. And the read circuit, when in a state of proximity communication with the non-contact type IC chip, reads the lamp identification information from the non-contact type IC chip (for example, processing of step S12 shown in FIG. 4 that is executed by the read block 25 shown in FIG. 1).

In the above-mentioned lamp drive apparatus, the lamp identification information is stored in a storage apparatus (for example, a semiconductor memory 42 shown in FIG. 3) arranged on the lamp. The read circuit reads the lamp identification information from the storage apparatus when the lamp is mounted (for example, processing step S12 shown in FIG. 4 that is executed by the read block 25 shown in FIG. 1).

In the above-mentioned lamp driving apparatus, the lamp driving apparatus is a projector (for example, a projector 11 shown in FIG. 1). This projector is configured to project an image onto a screen (for example, a screen 12 shown in FIG. 1) by a light radiated from the lamp.

Figure 5:
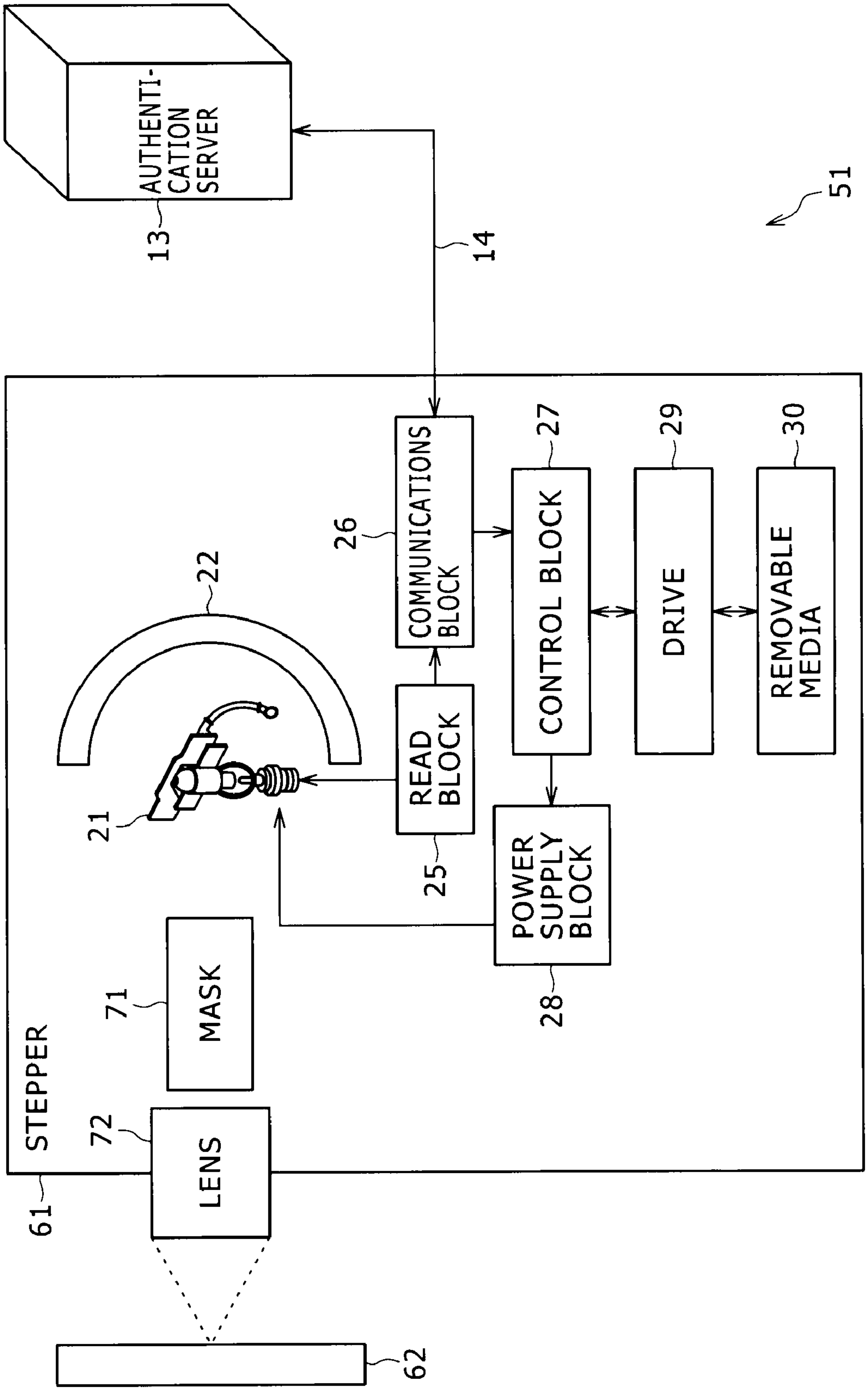
FIG. 5 is a block diagram illustrating another exemplary configuration of the authentication system practiced as an embodiment of the present invention.

In the above-mentioned lamp driving apparatus, the lamp driving apparatus is a stepper (for example, a stepper 61 shown in FIG. 5). This stepper is configured to manufacture semiconductor devices by projecting a predetermined pattern onto a surface of a wafer (for example, a wafer 62 shown in FIG. 5) for exposure by a light radiated from the lamp.

A control method according to an embodiment of the present invention is configured to control a lamp driving apparatus (for example, a projector 11 shown in FIG. 1) according to an embodiment of the present invention configured to drive a plurality of types of lamps (for example, lamps 21 shown in FIG. 1). Each of the plurality of lamps is attached with lamp identification information (for example, a serial number) for uniquely identifying the lamp. The lamp driving apparatus includes a lamp power supply (for example, a power supply block 28 shown in FIG. 1) configured to drive the lamp; a read circuit (for example, a read block 25 shown in FIG. 1) configured to read the lamp identification information from the lamp; and a control circuit (for example, a control block 27 shown in FIG. 1) configured to control the lamp power supply on the basis of a result of identification obtained by use of the read lamp identification information. The control circuit, if the lamp is found to be authorized, makes the lamp power supply drive the lamp (for example, processing of step S15 shown in FIG. 4 that is executed by the control block 27 shown in FIG. 1).

The following describes embodiments of the present invention with reference to drawings accompanied hereto.

Now, referring to FIG. 1, there is shown a block diagram illustrating an exemplary configuration of an authentication system to which an embodiment of the present invention is applied.

In an authentication system 1 shown in FIG. 1, a projector 11 and an authentication server 13 are connected to a communications route 14, such as a VPN (Virtual Private Network) and the Internet. It should be noted that, over the communications route 14, information encrypted by SSL (Secure Socket Layer), for example, is transferred so as to obtain the security of communication with the projector 11 and the authentication server 13.

The projector 11 is installed at a movie theater, for example, to project, onto a screen 12, the image corresponding to the digital data of a movie (or a material) to be screened at that movie theater. As a result, the movie is played on the screen 12.

The authentication server 13, made up of a dedicated server for example, is installed by a manufacturer of the projector 11 or a lamp 21, for example. The authentication server 13 holds information (hereafter referred to as lamp identification information) for uniquely identifying each manufactured lamp in advance, authenticates whether the lamp 21 installed on the projector 11 is an authorized product in response to an inquiry from the projector 11, and notifies the projector 11 an authorization result.

The projector 11 includes the lamp 21, a lamp house 22, an optical block 23, a lens 24, a read block 25, a communications block 26, a control block 27, and a power supply block 28.

The lamp 21 is a xenon lamp, for example, and mounted on the lamp house 22. A light radiated from the lamp 21 is collected by a condensing mirror of the lamp house 22. The collected light is optically modulated by the optical block 23 on the basis of the digital data of a movie (or a material) to be screened. A resultant image light is projected to the screen 12 through the lens 24. Consequently, the movie is played on the screen 12.

Figure 2:
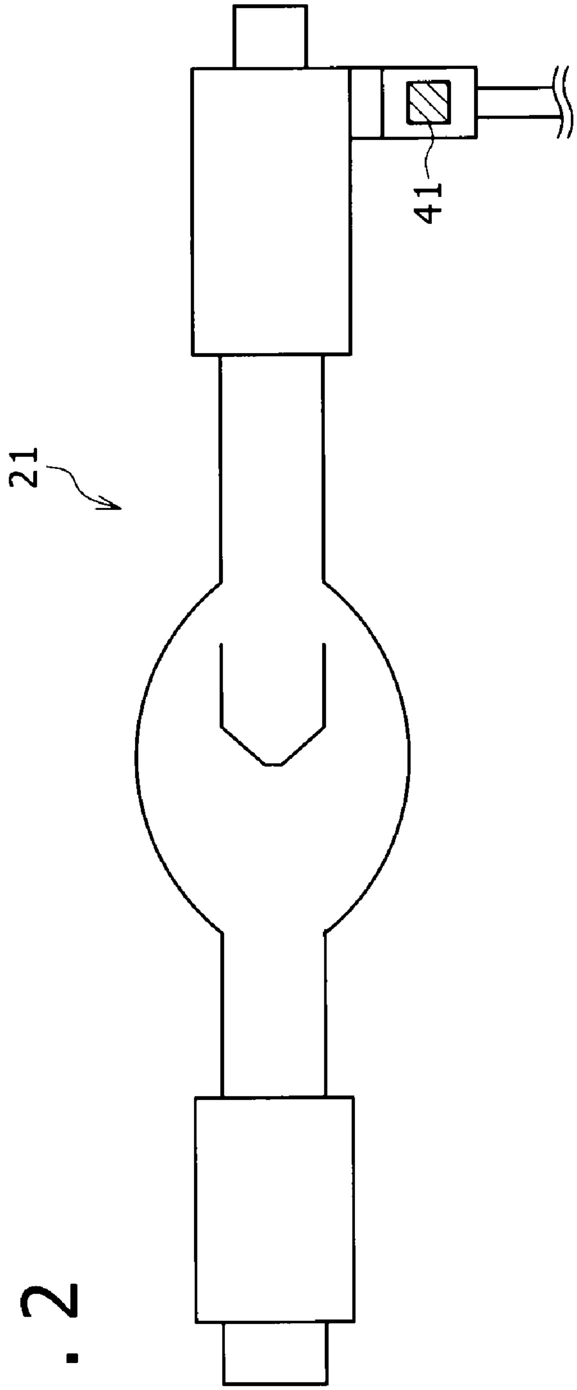
FIG. 2 is a schematic diagram illustrating an exemplary external view of a lamp.

In the present embodiment, the lamp 21 has a shape as shown in FIG. 2. Namely, in the present embodiment, any lamp that may be mounted on the projector 11 as the lamp 21 has the same shape.

As shown in FIG. 2, a non-contact type IC chip 41 is arranged on the lamp 21. Lamp identification information, such as a serial number, is recorded to the non-contact type IC chip 41 in order to uniquely identify the lamp 21. Namely, the serial number recorded to the non-contact type IC chip 41 and the lamp identification information held by the authentication server 13 provide the information for uniquely identifying the lamp 21. Therefore, the authentication server 13 authenticates the lamp 21 by use of these pieces of information.

Referring to FIG. 1 again, the read block 25 includes a reader/writer configured to execute proximity communication with the non-contact type IC chip 41, thereby executing proximity communication with the non-contact type IC chip 41 arranged on the lamp 21 by use of a carrier wave having a predetermined frequency. The read block 25 is configured as a circuit having a function of reading the lamp identification information of the lamp 21, for example.

To be more specific, when the lamp 21 is mounted on the lamp house 22 by a cinematographist for example, the non-contact type IC chip 41 and the reader/writer are put in a positional relation capable of executing proximity communication, so that proximity communication is executed between the non-contact type IC chip 41 and the reader/writer. Consequently, the read block 25 reads a serial number from the non-contact type IC chip 41 arranged on the lamp 21 and supplies the serial number to the communications block 26.

Figure 3:
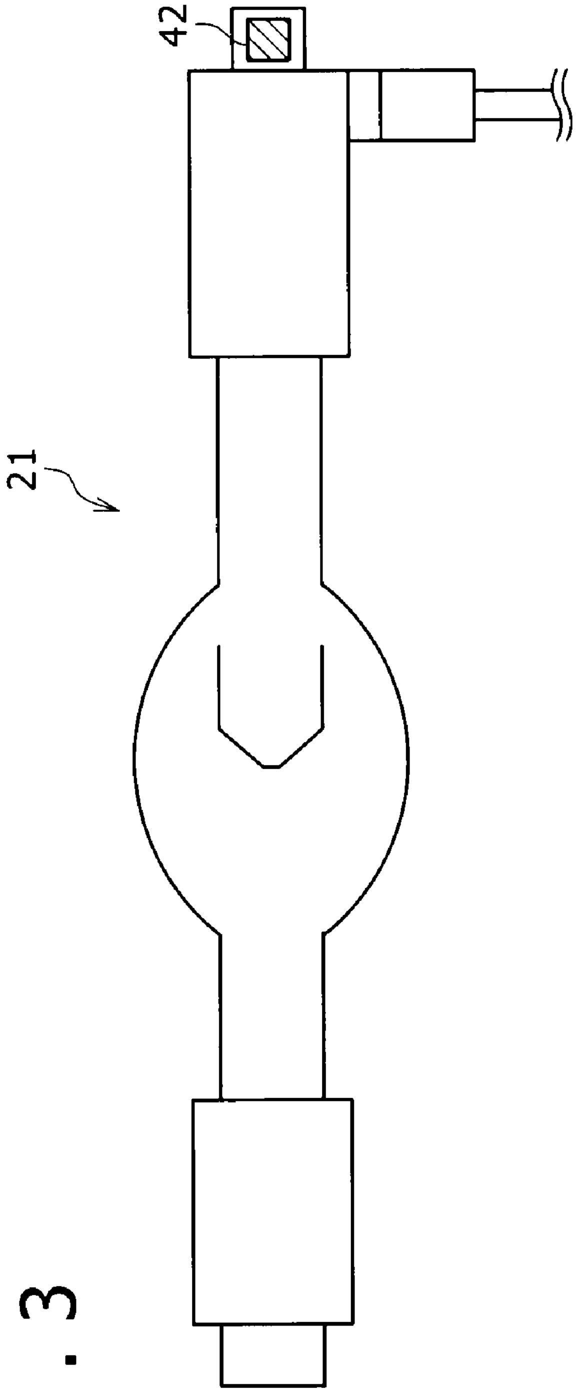
FIG. 3 is a schematic diagram illustrating an exemplary external view of a lamp.

As shown in FIG. 3, it is also practicable to arrange a semiconductor memory 42 made up of a nonvolatile memory, such as a ROM (Read Only Memory) for example in which the serial number is stored, on the lamp 21 instead of the non-contact type IC chip 41 shown in FIG. 2. In this case, when the lamp 21 is mounted on the lamp house 22 by a cinematographist for example, the serial number stored in the semiconductor memory 42 becomes physically readable, so that the serial number is read from the semiconductor memory 42 by the read block 25.

As described above, the lamp 21 has the non-contact type IC chip 41 or a semiconductor memory 42 recorded with the serial number for uniquely identifying the lamp. It is also practicable to record the serial number by means of another method. For example, instead of electrically recording the serial number as described above, a barcode corresponding to the serial number may be printed to the lamp 21, the barcode being read by the read block 25. Essentially, it is acceptable if the serial number of the mounted lamp is obtained by the projector, so that there is no limitation to the means and methods for serial number reading.

It should be noted that the non-contact type IC chip 41 or the semiconductor memory 42 is desirably arranged on the lamp 21 at a metal or ceramic portion thereof other than a support by which the lamp 21 is attached to the lamp house 22.

It should also be noted that, because the lamp 21 generates high-temperature heat when it is turned on, it is possible for the non-contact type IC chip 41 or the semiconductor memory 42 to become inoperable by the heat; in the present embodiment, however, the authentication may be executed once basically, so that there is no special problem if the non-contact type IC chip 41 or the semiconductor memory 42 becomes unserviceable after authentication. On the contrary, the serial number recorded to the non-contact type IC chip 41 or the semiconductor memory 42 becomes unusable after authentication, so that the unauthorized use of the serial number can be prevented.

Further, the shape of the lamp 21 is not limited to the shapes shown in FIGS. 2 and 3; any shape that allows the lamp 21 to be mounted on the lamp house 22 is applicable. In other words, the shape of the lamp 21 depends on the structure of the lamp house 22. Namely, the lamp house 22 in the present embodiment has, by chance, the structures which allow the mounting of the lamp 21 shown in FIGS. 2 and 3.

Referring to FIG. 1 again, the communications block 26 is a circuit having a function of communication with other devices via the communications route 14, for example, transmitting the serial number received from the read block 25 to the authentication server 13 via the communications route 14. The communications block 26 also receivers an authentication result from the authentication server 13 via the communications route 14 and supplies the received authentication result to the control block 27.

The authentication result received from the authentication server 13 may be a management number for managing the lamp 21 on the side of the authentication server, for example. Therefore, if the lamp 21 has been successfully authenticated by the authentication server 13, then the management number of the lamp 21 is transmitted to the projector 11 via the communications route 14.

The control block 27 is a circuit having a function of controlling the power supply block 28 for example and stores the management number supplied from the communications block 26 into an internal memory (not shown) of the control block 27, thereby controlling the power supply block 28 on the basis of this management number.

The power supply block 28 is a power supply that can drive two or more lamps 21. To be more specific, under the control of the control block 27, the power supply block 28 provides a proper drive power to the lamp 21 mounted on the lamp house 22.

A drive 29 drives a loaded removable media 30, such as magnetic disk, optical disk, magneto-optical disk, or a semiconductor memory, thereby reading programs and data from the loaded removable media 30. The obtained programs and data are transferred, as required, to an internal memory (not shown) of the control block 27 to be stored therein.

The authentication system 1 is configured as described above.

It should be noted that the authentication system 1 configured to realize a digital cinema system generally includes a materials server (not shown) for providing the digital data of a movie (or a material) to be screened to the projector 11 and a maintenance server (not shown) for use by a provider of services of maintaining movie theater equipment, for example, in addition to the projector 11 and the screen 12 that are installed in each movie theater. In the present embodiment, it is also practicable to provide the function of the authentication server 13 on a maintenance server or another existing apparatus, without providing the authentication server 13, thereby providing the authentication of the lamp 21 by that existing apparatus instead of the authentication server 13.

The following describes the authentication processing that is executed between the projector 11 and the authentication server 13 that make up the authentication system 1, with reference to the flowchart shown in FIG. 4.

It should be noted that the processes of steps S11 through S15 are executed by the projector 11 and the processes of steps S21 through S24 are executed by the authentication server 13.

In step S11, the projector 11 determines whether proximity communication is practicable with the non-contact type IC chip 41 mounted on the lamp 21.

If proximity communication with the non-contact type IC chip 41 is found to be practicable in step S11 when the lamp 21 is mounted on the lamp house 22, then the read block 25 reads the serial number from the non-contact type IC chip 41 by proximity communication in step S12.

In step S13, the communications block 26 transmits the serial number read from the non-contact type IC chip 41 to the authentication server 13 via the communications route 14.

In step S21, having received the serial number from the projector 11, the authentication server 13 executes the processes of steps S22 through S24.

To be more specific, in step S22, the authentication server 13 executes authentication processing by use of the received serial number and the lamp identification information held in the authentication server 13. Next, if the authentication is found to be successful, namely, if the lamp 21 from which the serial number is transmitted is found to be an authorized lamp in step S23, then the authentication server 13 transmits a management number corresponding to the lamp 21 to the projector 11 via the communications route 14 in step S24. It should be noted that, by relating the serial number and the management number and storing this relation beforehand, the authentication server 13 can grasp the information about the lamp 21 currently in use.

On the other hand, if the authentication is found unsuccessful in step S23, then the process of step S24 is skipped to end the authentication processing. It should be noted that, if the authentication is found to be unsuccessful, the authentication server 13 may notify the projector 11 thereof.

In step S14, the communications block 26 receives the management number from the authentication server 13 via the communications route 14.

In step S15, the control block 27 stores the received management number into an internal memory (not shown) and controls the power supply block 28 on the basis of the stored management number, thereby driving the lamp 21.

Namely, in the projector 11, if the lamp 21 is found to be authorized by the authentication server 13, the management number is provided, so that the lamp 21 is driven by the power supply block 28 on the basis of this management number. Consequently, the power supply to the lamp 21 is enabled, thereby projecting the movie onto the screen 12.

As described above, incorporating a network authentication system into each lamp for use in projectors for use in the digital cinema field can prevent the degradation of quality and performance due to poor-quality third party compatibles, thereby keeping the digital cinema screening quality at high levels.

In addition, authenticating, via a network in advance, each lamp of which serial number is stored allows a lamp maintenance service provider (for example, the supplier or seller of projectors and lamps) for example to be safely engaged with the quality and safety of each product used by customer. Consequently, the genuine parts guarantee can be made on each lamp used by customer.

It should be noted that, in the above-mentioned example, the above-mentioned embodiment of the present invention is applied to projectors; in the present invention, the above-mentioned embodiment of the invention is applicable not only to digital cinema projectors but also to any kinds of projectors that use expensive high-voltage lamps, such as xenon lamps. In addition, the above-mentioned embodiment of the present invention is applicable to devices based on lamps, such as steppers for use in the manufacture of semiconductor devices, for example. The following describes an example in which the present embodiment is applied to steppers.

Referring to FIG. 5, there is shown a block diagram illustrating a configuration of an authentication system practiced as another embodiment of the invention.

It should be noted that, with reference to FIG. 5, components similar to these previously described with FIG. 1 are denoted by the same reference numerals and therefore the components having the same reference numerals will be not described for brevity. Namely, in an authentication system 51 shown in FIG. 5, a stepper 61 is arranged instead of the projector 11 shown in FIG. 1. The stepper 61 has a mask 71 and a lens 72 instead of the optical block 23 and the lens 24 of the projector 11 shown in FIG. 1, the other configuration of the stepper 61 being the same as that of the projector 11 shown in FIG. 1.

The stepper 61 is a device configured to manufacture semiconductor devices, such as ICs (Integrated Circuits) and LSIs (Large Scale Integrations) and image-capturing devices, such as CCDs (Charge Coupled Devices).

In the stepper 61, the light radiated from a lamp 21 enters in the lens 72 through a pattern of the mask 71. Next, the light which goes through the pattern passes the lens 72 to be condensed to a predetermined size to be projected onto the surface of a wafer 62 for exposure.

In the stepper 61 configured as described above, as with the projector 11 shown in FIG. 1, if the lamp 21 to be mounted is found to be authorized by the authentication server 13, then a management number is provided, so that a power supply block 28 drives the lamp 21 on the basis of this management number.

Namely, although details will not be described for brevity, the authentication processing to be executed between the stepper 61 and the authentication server 13 is substantially the same as the authentication processing executed between the projector 11 and the authentication server 13 described with reference to the flowchart of FIG. 4, the difference lying only between the projector 11 and the stepper 61.

Thus, performing network-authentication processing on each lamp for use in the stepper 61 for use in semiconductor device manufacture can prevent the lowering of the quality and performance of each lamp.

The above-mentioned sequence of processing operations may be executed by software as well as hardware. When the above-mentioned sequence of processing operations is executed by software, the programs constituting the software are installed in a computer which is built in dedicated hardware equipment, or installed, from a recording media, into a general-purpose personal computer for example in which various programs may be installed for the execution of various functions.

The above-mentioned recording media is configured not only by the removable medium 30 shown in FIG. 1 or FIG. 5 such as a magnetic disk (including a flexible disk), an optical disk (including CD-ROM (Compact Disc Read Only Memory)), DVD (Digital Versatile Disc), a magneto-optical disk (including MD (Mini Disc) (trademark)), or a semiconductor memory recorded with programs for distribution of programs to users separately from the computer, but also by the ROM or the recording block (not shown) for distribution of computers which programs are pre-installed to users.

It should be noted that, programs which execute the above-mentioned sequence of processing may be installed into a computer via a wired or wireless communication media such as LAN (Local Area Network), the Internet, or a digital satellite broadcast, through interfaces such as routers or modems as required.

It should be noted herein that the steps for describing each program recorded in recording media include not only the processing operations which are sequentially executed in a time-dependent manner but also the processing operations which are executed concurrently or discretely.

It should also be noted that term "system" as used herein denotes a logical set of a plurality of component units and these component units are not necessary accommodated in a same housing.

While preferred embodiments of the present invention have been described using specific terms, such description is merely for illustrative purpose, and it is to be understood that changes and variations may be made without departing from the spirit or scope of the following claims.

What is claimed is:

1. A lamp driving apparatus configured to drive a plurality of types of lamps, each of said plurality of lamps being attached with lamp identification information for uniquely identifying said lamp, said lamp driving apparatus comprising:

a lamp power supply configured to drive said lamp;

a read circuit configured to read said lamp identification information from said lamp;

a control circuit configured to control said lamp power supply on the basis of a result of identification obtained by use of said read lamp identification information; and a communications circuit configured to transmit said read lamp identification information to an authentication apparatus configured to authenticate said lamp, wherein said control circuit, if said lamp is found to be authorized, makes said lamp power supply drive said lamp, said communications circuit receives an authentication result of said lamp transmitted from said authentication apparatus, and said control circuit controls said lamp power supply on the basis of the received authentication result.

2. The lamp driving apparatus according to claim 1, wherein said lamp identification information is recorded to a non-contact type integrated circuit chip mounted on said lamp, and said read circuit, when in a state of proximity communication with said non-contact type integrated circuit chip, reads said lamp identification information from said non-contact type integrated circuit chip.

3. The lamp drive apparatus according to claim 1, wherein said lamp identification information is stored in a storage apparatus arranged on said lamp, and said read circuit reads said lamp identification information from said storage apparatus when said lamp is mounted.

4. The lamp driving apparatus according to claim 1, wherein said lamp driving apparatus is a projector and said projector projecting an image onto a screen by a light radiated from said lamp.

5. The lamp driving apparatus according to claim 1, wherein said lamp driving apparatus is a stepper configured to manufacture semiconductor devices, said stepper projecting a predetermined pattern onto a surface of a wafer for exposure by a light radiated from said lamp.

6. A method for controlling a lamp driving apparatus configured to drive a plurality of types of lamps, each of said plurality of lamps being attached with lamp identification information for uniquely identifying said lamp, said method comprising reading, with a read circuit, said lamp identification information from said lamp;

controlling, with a control circuit, a lamp power supply configured to drive said lamp on the basis of an authentication result of identification obtained by use of said read lamp identification information;

causing, with said control circuit, said lamp power supply to drive said lamp, if said lamp is found to be authorized;

transmitting said read lamp identification information to an authentication apparatus configured to authenticate said lamp; and receiving the authentication result of said lamp from said authentication apparatus.

* * * * *